(12) United States Patent
Siciliano et al.

(10) Patent No.: US 6,189,664 B1
(45) Date of Patent: Feb. 20, 2001

(54) POWER LINE FOR AN ELECTRIC VEHICLE

(75) Inventors: Vito Siciliano, Pieve Ligure; Alcide Del Naja, Naples, both of (IT)

(73) Assignee: Ansaldo Transporti S.p.A., Naples (IT)

( * ) Notice: Under 35 U.S.C. 154(b), the term of this patent shall be extended for 0 days.

(21) Appl. No.: 09/367,648

(22) PCT Filed: Feb. 20, 1998

(86) PCT No.: PCT/IT98/00035

§ 371 Date: Dec. 10, 1999

§ 102(e) Date: Dec. 10, 1999

(87) PCT Pub. No.: WO98/36933

PCT Pub. Date: Aug. 27, 1998

(30) Foreign Application Priority Data

Feb. 21, 1997 (IT) ............................................. T097A0150

(51) Int. Cl.⁷ .................................................. B60M 1/00
(52) U.S. Cl. .................................. 191/18; 191/6; 191/14; 191/15
(58) Field of Search .................................. 191/1 A, 6, 4, 191/12 R, 13, 14, 15, 16, 18, 19, 20, 21, 22 R, 23 R; 180/2.1

(56) References Cited

U.S. PATENT DOCUMENTS

| | | | |
|---|---|---|---|
| 4,057,753 | * 11/1977 | Perry et al. | 191/4 |
| 4,139,071 | * 2/1979 | Tackett | 180/2.1 |
| 4,836,344 | * 6/1989 | Bolger | 191/15 |
| 5,277,285 | * 1/1994 | Musachio | 191/6 |
| 5,810,136 | * 9/1998 | Sicliano et al. | 191/18 |

* cited by examiner

Primary Examiner—Mark T. Le
(74) Attorney, Agent, or Firm—Quarles & Brady LLP

(57) ABSTRACT

A power line (1) wherein a hollow elongated enclosure (4) houses a conducting line (27) and an elastically deformable strip element (60) which is normally in a rest position extending substantially undeformed along the whole of the enclosure when the line is not engaged by an electric vehicle. The strip element (60) interacts with a magnetic field generated by an electric vehicle (80) engaging the line, to attract a portion (60a) of the strip element (60) into a raised contact position in which an electric connection is established between the conducting line (27) and at least one power plate (34) outside the enclosure (4). The line also has a detecting device (52) for detecting the strip element (60) in the rest position and so determining non-engagement of the line.

11 Claims, 6 Drawing Sheets

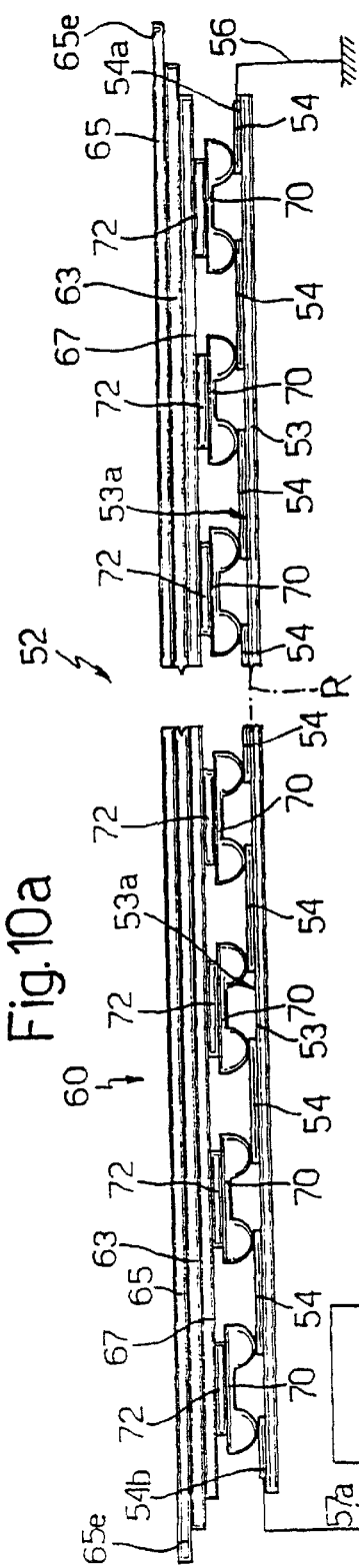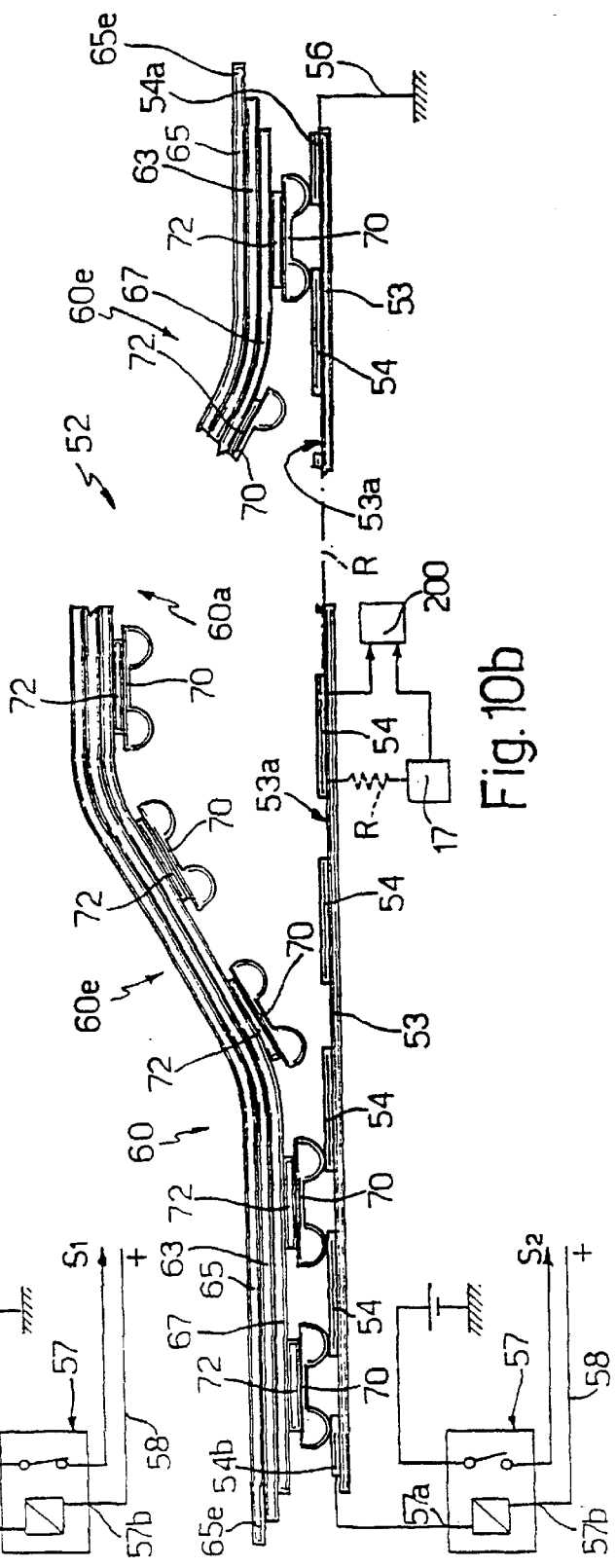

1

POWER LINE FOR AN ELECTRIC VEHICLE

TECHNICAL FIELD

The present invention relates to a power line for an electric vehicle.

BACKGROUND ART

Power lines for electric vehicles—such as the one described in German Patent n° 1.011.914 by Ludwig Reihardt, published on Jul. 11, 1957—are known to comprise an elongated insulating enclosure closed at the top by a number of conducting plates aligned in a straight direction and insulated from one another. The enclosure houses an elastically deformable conducting strip element made of ferromagnetic material, and which is attracted by the magnetic field generated by electromagnets to flex a portion of the conducting strip element towards the conducting plates to electrically supply at least one.

French Patent n° 1.151.382 by Jean-Florent DE BRUYN and Josè-Gaston DE BRUYN, published on Jan. 29, 1958, describes an electric vehicle current supply system comprising a hollow elongated insulating enclosure closed at the top by a number of conducting plates aligned in the traveling direction of the vehicle and separated by insulating elements interposed between adjacent conducting plates. The enclosure houses an elastically deformable conducting strip element extending in the traveling direction of the vehicle, and having a strip portion of ferromagnetic material on which is superimposed a strip portion of good electrically conducting material. The conducting element is attracted by the magnetic field generated by electromagnets on an electric vehicle to flex a portion of the conducting strip element towards the conducting plates to electrically supply at least one.

The power lines described in the above patents have no means by which to determine the location of the electric vehicle along the line.

DISCLOSURE OF INVENTION

It is an object of the present invention to provide a power line of the above type, which also provides for determining the location of the electric vehicle along the line. It is a further object of the present invention to provide a power line defined by a number of elementary modules connectable to one another, and which provides for detecting the elementary module along which the electric vehicle is traveling.

According to the present invention, there is provided a power line of the type described in claim 1.

BRIEF DESCRIPTION OF THE DRAWINGS

A preferred, non-limiting embodiment of the present invention will be described by way of example with reference to the accompanying drawings, in which:

FIGS. 10a and 10b show a detail of the line according to the present invention in two different operating positions.

BEST MODE FOR CARRYING OUT THE INVENTION

Figure 1:
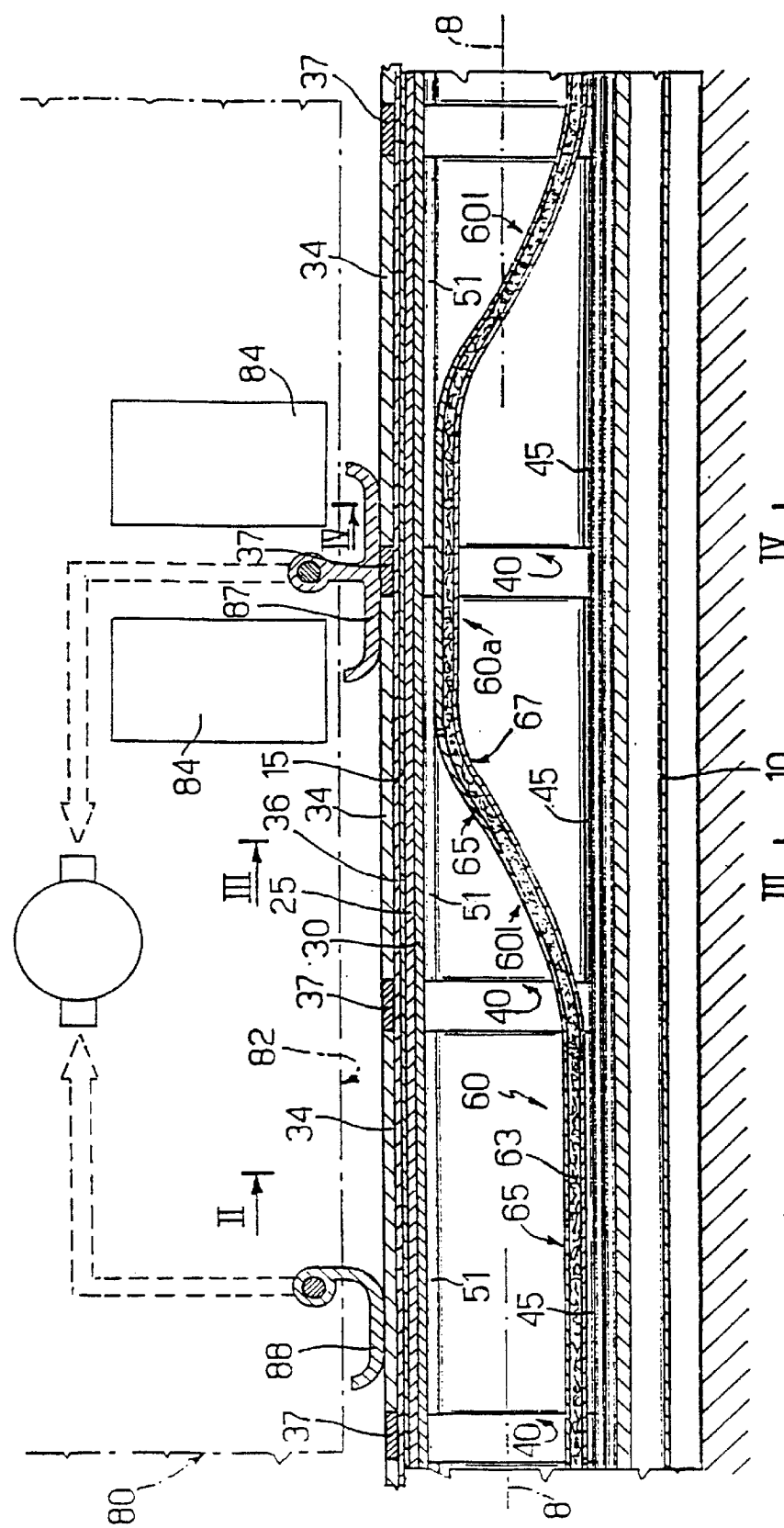
FIG. 1 shows a longitudinal section of a power line for an electric vehicle in accordance with the teachings of the present invention.

With reference to FIGS. 1, 2, 3 and 4, number 1 indicates as a whole a modular power line for an electric vehicle.

Power line 1 comprises a number of elongated insulating enclosures (modules) 4, each defining internally an elongated parallelepiped cavity 6 extending in a straight direction (along an axis) 8.

More specifically, each enclosure 4 is formed in one piece, and comprises a bottom horizontal insulating wall 10; two vertical lateral insulating walls 11, 12 perpendicular to wall 10; and a top horizontal insulating wall 15 parallel to and opposite bottom wall 10.

Enclosure 4 houses a metal conducting enclosure 17 defining internally an elongated parallelepiped cavity 18 extending along axis 8, and comprising a bottom wall 20 facing wall 10, two vertical lateral walls 21, 22 integral with and perpendicular to wall 20, and a flat top metal wall 25 contacting and fitted to wall 15 by fastening devices (not shown).

Enclosure 17 houses a first electric power conducting line 27 comprising a straight metal conducting element housed in a top portion of cavity 18 and separated electrically from adjacent metal walls 21 and 25. More specifically, conducting element 27 has a substantially L-shaped cross section, and comprises a flat horizontal first portion 27a adjacent and parallel to a flat insulating wall 30 underlying wall 25, and a flat vertical second portion 27c perpendicular to and integral with portion 27a and supported on a vertical insulating wall 32 parallel and adjacent to metal vertical wall 21.

Metal enclosure 17 defines a second electric power conducting line 23 extending substantially the whole length of insulating enclosure 4.

Figure 2:
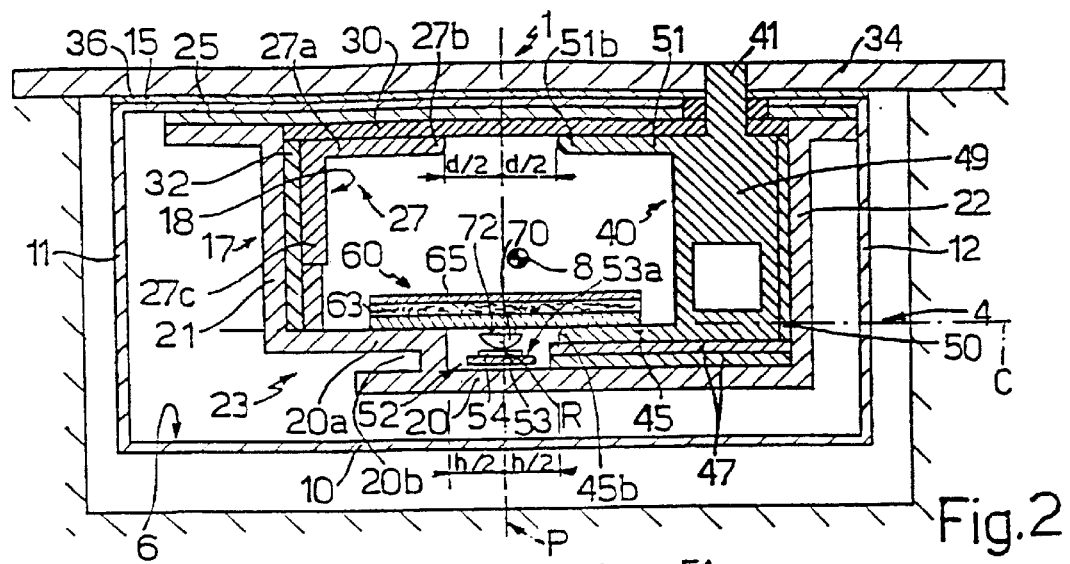
FIG. 2 shows a cross section of the power line along line II—II in FIG. 1.
Figure 3:
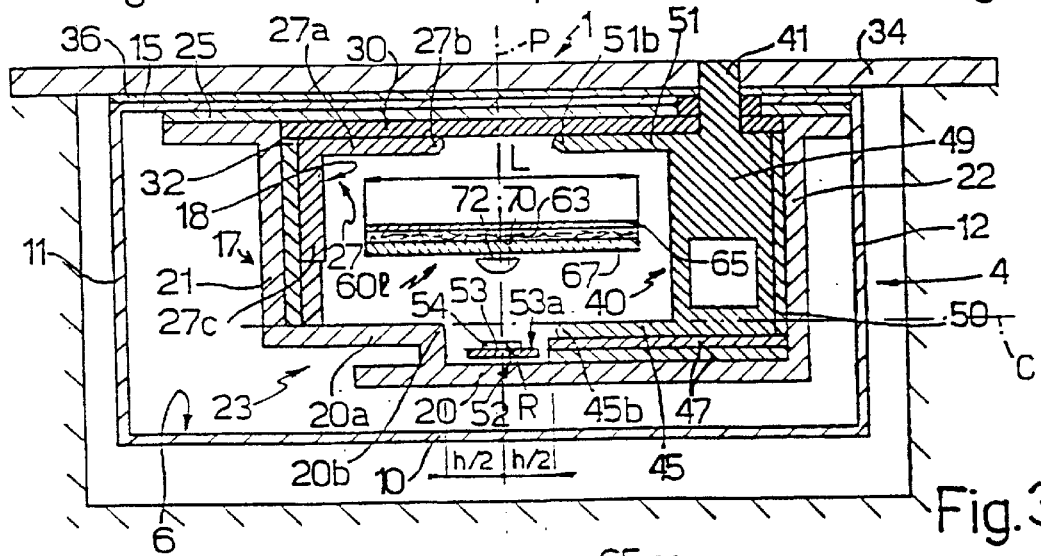
FIG. 3 shows a cross section of the power line along line III—III in FIG. 1.
Figure 4:
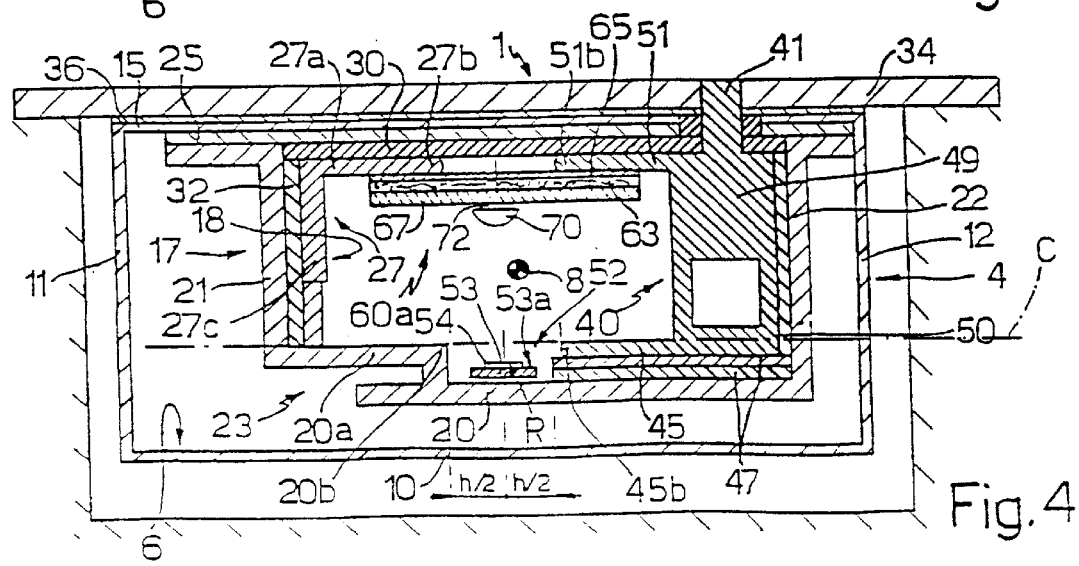
FIG. 4 shows a cross section of the power line along line IV—IV in FIG. 1.

With reference to FIGS. 2, 3 and 4, power line 1 comprises a number of rectangular metal plates 34 outside enclosures 4.

More specifically, each plate 34 is fitted to top wall 15 via the interposition of a rubber sheet 36, is connected to enclosure 4 by fastening devices (not shown), and extends beyond the width of wall 15 so that end portions project from enclosure 4.

Power line 1 also comprises a number of insulating elements 37 (FIG. 1) located outside enclosures 4 and interposed between plates 34. More specifically, each insulating element 37 is interposed between and electrically separates two adjacent metal plates 34. Each metal plate 34 communicates with a respective electric feeder device 40 housed inside cavity 18 and connected to plate 34 by a respective electric conductor 41 extending through insulating wall 30, metal wall 25 (from which it is insulated), wall 15 of enclosure 4, and rubber sheet 36.

Feeder 40 substantially comprises a C-shaped metal wall in turn comprising a flat horizontal first portion 45 supported on an insulating wall 47 superimposed on metal bottom wall 20; a vertical second portion 49 facing and separated electrically from metal lateral wall 22 by an insulating wall 50; and a flat horizontal third portion 51 perpendicular to and integral with vertical portion 49 and contacting insulating wall 30.

Flat portions 51 and 45 are therefore parallel and face each other on opposite sides of cavity 18; and portions 51 and 45 of the various feeder devices 40 are spaced along axis 8 and the full length of enclosure 4 to respectively define first and second electric collectors for the purpose explained later on.

Flat portion 51 (first collector) is coplanar with portion 27a of first electric power line 27; and flat portion 51 and portion 27a are separated electrically and have respective parallel facing edges 51b and 27b equidistant (distance d/2) from the plane of symmetry P, perpendicular to walls 10 and 15, of enclosure 4.

Flat portion 45 (second collector) is coplanar with a plane C (indicated by the dot-and-dash line in FIGS. 2, 3, 4) perpendicular to plane of symmetry P; a flat portion 20a of the second electric power line is also coplanar with plane C; and flat portion 45 and portion 20a are separated electrically and have respective parallel facing edges 45b and 20b equidistant (distance h/2) from plane of symmetry P.

According to the present invention, each enclosure 4 of line 1 has a position detecting device 52 (not shown in FIG. 1 for the sake of simplicity) housed inside parallelepiped cavity 18, and for detecting (as explained clearly later on) use of a respective module of line 1 to power an electric vehicle. More specifically (FIGS. 2–4 and 10a, 10b), device 52 comprises an elongated rectangular insulating support 53 housed inside cavity 18 along axis 8, between second collector 45 and portion 20a, and with a flat rectangular face 53a parallel to plane C and adjacent to bottom wall 20. Insulating support 53 carries on face 53a a number of conducting pads 54 separated electrically from one another and coplanar with a plane parallel to plane C. More specifically, pads 45 are rectangular and aligned in a straight direction R parallel to the long sides of support 53 and to axis 8; and the end pads 54a and 54b of the line (i.e. those close to the short edges of rectangular support 53) are connected respectively to a conducting element 56 connected to a reference potential, and to a first supply terminal 57a of a relay 57, which has a second supply terminal 57b connected to an auxiliary supply line 58 for supplying relay 57 with a supply voltage (of about ten volts) by which to energize relay 57. When energized, relay 57 supplies a high output signal S1 indicating non-engagement of the modular enclosure 4 housing device 52; and, when not energized, relay 57 supplies a low output signal S2 (e.g. of zero volts) indicating engagement of the modular enclosure 4 housing device 52.

Figure 6:
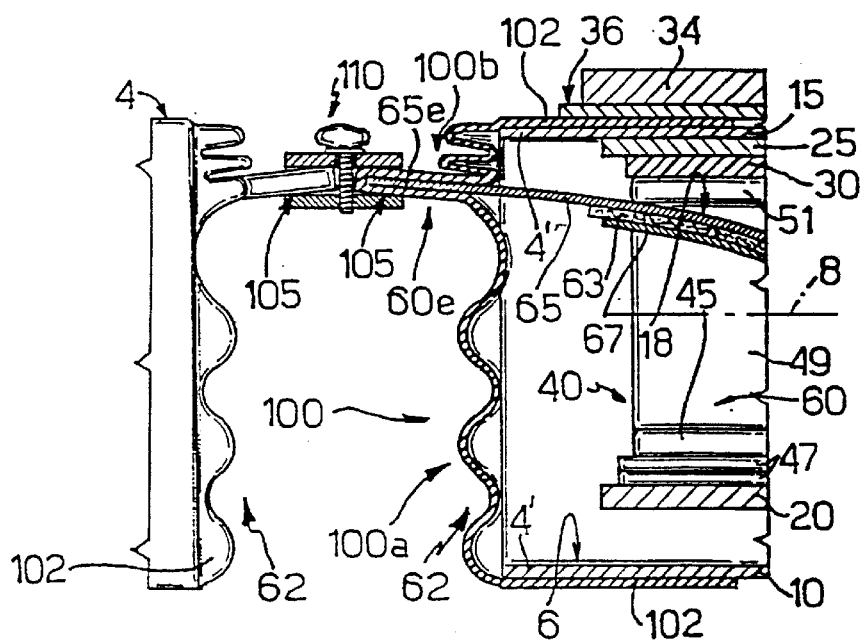
FIGS. 6 and 7 show longitudinal sections of an end portion of a FIG. 5 module in two different operating positions.
Figure 7:
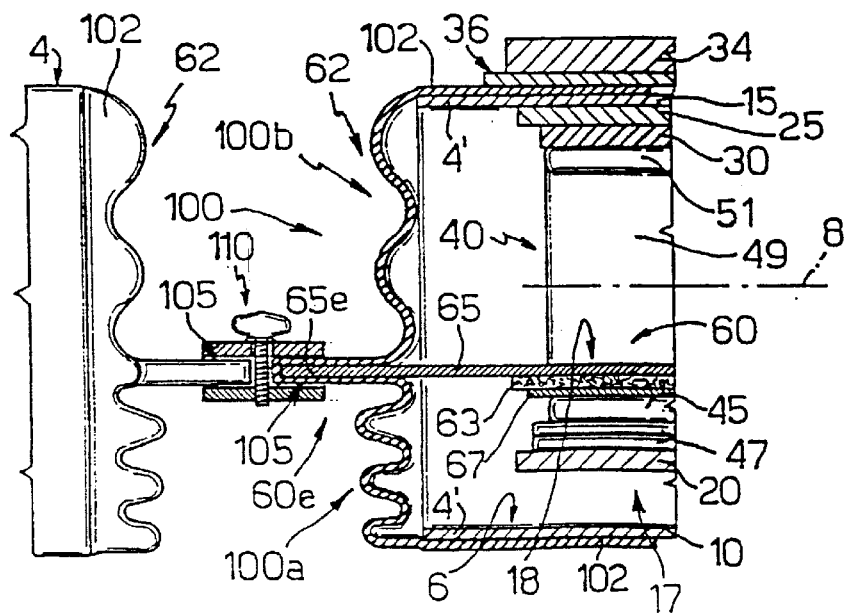

Feeder device 40 also cooperates with a conducting strip element 60, which is housed inside cavity 18, extends the full length of enclosure 4, and, when in the rest position (FIGS. 2 and 10a), is substantially perpendicular to and symmetrical with plane P. Conducting strip element 60 has opposite end portions 60e (FIGS. 6, 7) fitted to supporting and connecting devices 62 (described in detail later on) at opposite ends of enclosure 4.

Strip element 60 comprises a central portion 63 defined by a strip of flexible insulating material supporting conducting portions on opposite sides of insulating strip 63. More specifically, insulating strip 63 supports a flexible top conducting strip 65 made of ferromagnetic material and integral with and superimposed on strip 63. Strip 65 faces wall 25 and is of a width L greater than the distance d between facing edges 51b and 27b.

Strip element 60 also comprises a bottom conducting portion defined by a metal strip 67 facing wall 20 and integral with central insulating strip 63.

Metal strip 67 is of a width L greater than the distance h between facing edges 45b and 20b.

On the face facing wall 20, metal strip 67 (FIGS. 10a, 10b) carries a number of metal conducting elements 70, each of which is flat, is substantially in the form of an elongated rectangle, and is carried by an insulating supporting element 72 interposed between strip 67 and element 70 itself. At each end portion, each conducting element 70 has a curved portion with the convex side facing wall 20; and conducting elements 70 are aligned and equally spaced in a straight direction parallel to axis 8 (and equidistant from the long edges of strip 67).

Each element 70 is of a length greater than the distance between adjacent pads 54.

Each insulating enclosure 4 is provided, at two opposite end portions, with respective supporting and connecting devices 62, each of which provides for supporting an end portion 60e of conducting strip element 60, while at the same time permitting a substantially transverse movement of end portion 60e as explained later on.

Each device 62 comprises a rectangular elastic accordionlike wall 100 having, in cross section, an undulated profile, and comprising an elastic peripheral lip 102, which is fitted and secured firmly, e.g. by means of adhesive, to the peripheral end edges 4' of elongated parallelepiped enclosure 4.

Device 62 thus closes a respective end opening of enclosure 4 to prevent any external agents entering cavities 6 and 18.

End portion 60e of conducting element 60 is defined by a rectangular end portion 65e of flexible top strip 65, which rectangular end portion 65e projects from the ends of central insulating portion 63 and metal strip 67, and is narrower than top strip 65.

Figure 8:
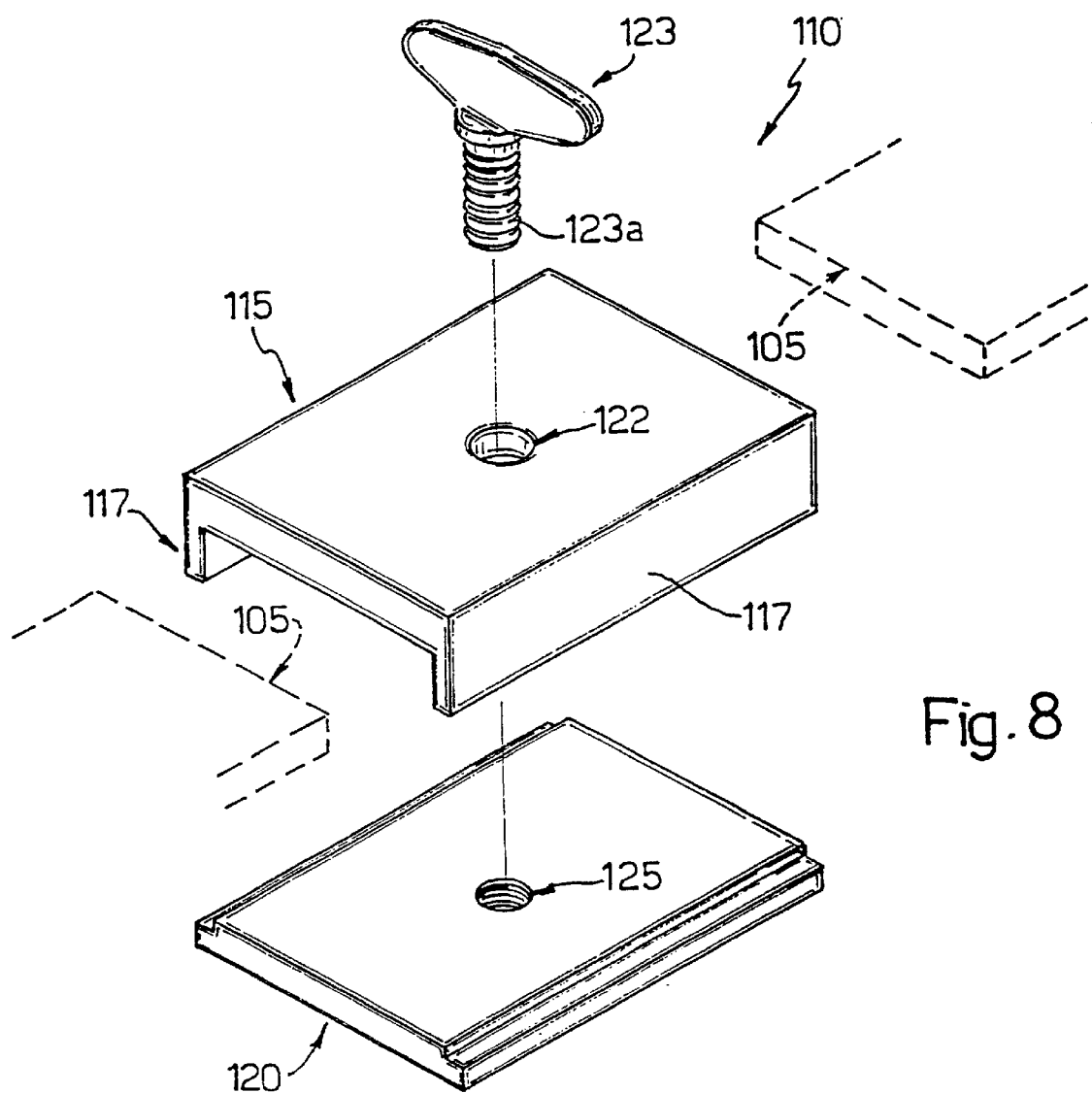
FIG. 8 shows an exploded view in perspective of a detail of the FIG. 1 power line.
Figure 9:
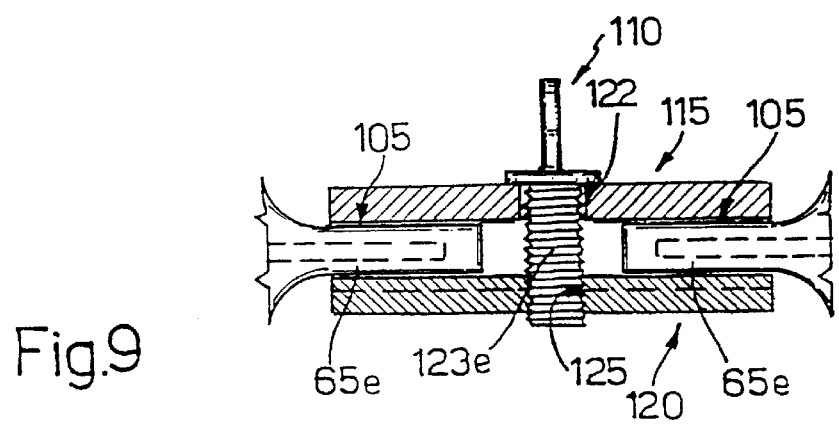
FIG. 9 shows a larger-scale cross section of the FIG. 8 detail.

End portion 65e projects from metal enclosure 17 (FIGS. 6, 7), and is housed inside a pocket 105 defined by a hollow parallelepiped appendix extending outwards of enclosure 4 from wall 100 and open on the side facing cavities 6 and 18. Pocket 105 is located approximately at a central portion of wall 100, so that a first number of undulated portions 100a are located between pocket 105 and bottom wall 10, and a second number of undulated portions 100b are located between pocket 105 and top wall 15. Supporting and connecting device 62 also provides for connecting the conducting strip elements 60 of different insulating enclosures 4; for which purpose (FIG. 7), the end portions of insulating enclosures 4 are positioned facing each other, with parallelepiped appendixes 105 aligned and also positioned with end portions facing each other. Each parallelepiped appendix 105 (and the respective end portion 65e housed in it) is connected to the parallelepiped appendix 105 (and respective end portion 65e housed in it) of the other enclosure by means of a bridging device 110. More specifically, bridging device 110 (FIGS. 8, 9) comprises a rectangular plate 115 with two rectangular wings 117 extending along the long sides of plate 115; and a rectangular plate 120, which is positioned facing and parallel to plate 115, with its own long edges between wings 117. Plate 115 also has a central hole 122 for housing the threaded shank 123a of a screw 123, which screws into a threaded central hole 125 formed in plate 120. Parallelepiped appendixes 105 are conveniently interposed between plates 115 and 120 and on opposite sides of screw 123, which is screwed into hole 125 to bring plates 115 and 120 closer together, to compress parallelepiped appendixes 105 between the plates, and to connect end portions 65e housed in respective appendixes 105.

Figure 5:
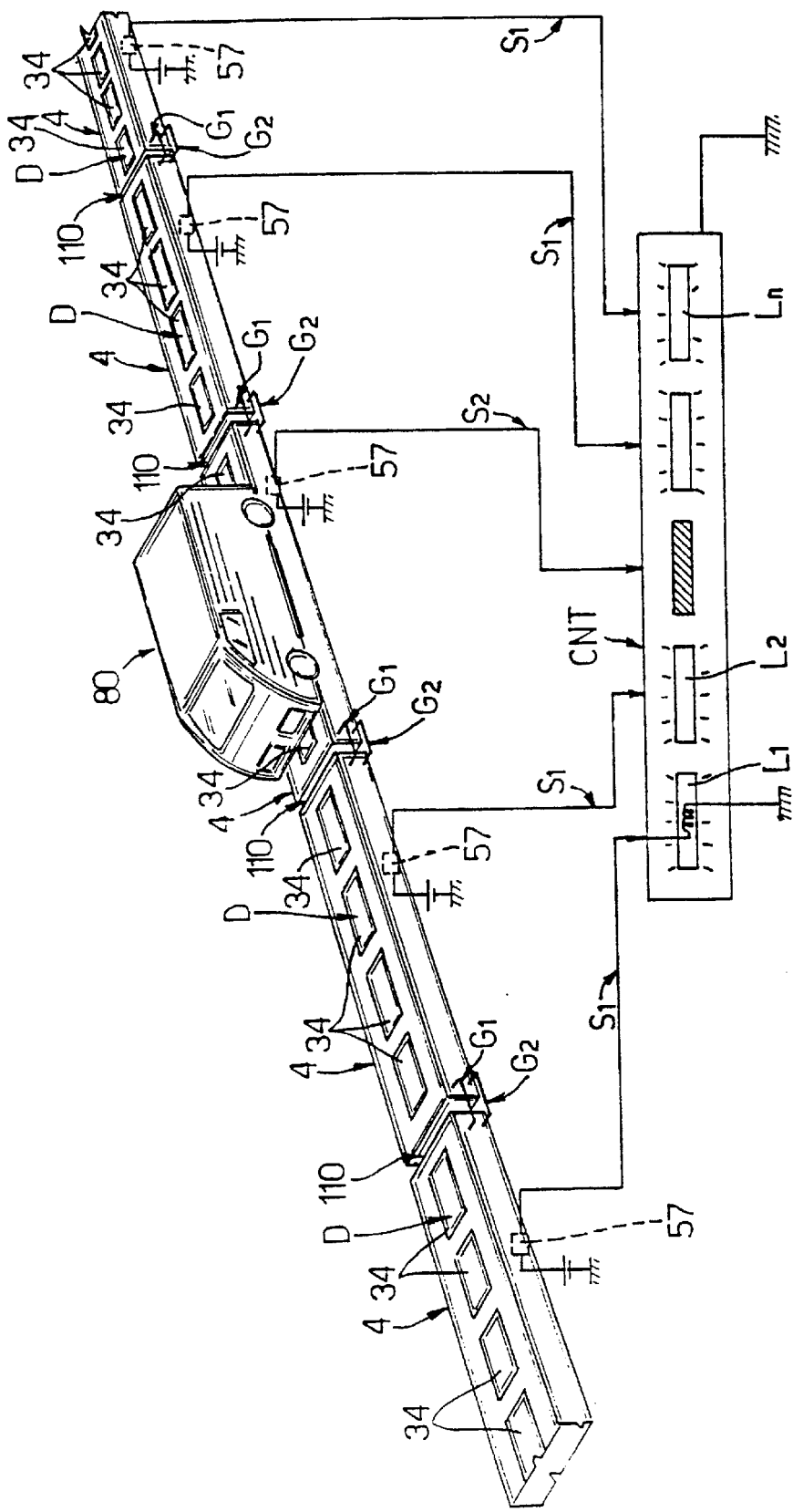
FIG. 5 shows a view in perspective of a power line in accordance with the present invention and comprising a number of connected modules.

In actual use, power line 1 is formed by aligning a number of enclosures 4 next to one another in a straight vehicle traveling direction D (FIG. 5); each pair of adjacent end portions 60e is connected mechanically, as described, using bridging device 110 to form an overall strip element extending the full length of line 1 and defined by the conducting strip elements 60 of the various connected enclosures 4; and electric lines 27 and 23 of one enclosure are connected electrically to the corresponding electric lines of the adjacent enclosure by means of external connecting cables Gl, G2 (shown schematically in FIG. 5) extending in fluidtight manner through enclosures 4.

The output signal of each detecting device 52 (connected to a respective modular enclosure 4) is supplied to a central control unit CNT (FIG. 5) for determining engagement/non-engagement of the various modular enclosures 4 of line 1. By way of a non-limiting example, control unit CNT may comprise an optical display device defined by a number of light-up elements $L_1$–$L_n$, each representing a respective enclosure 4 of line 1, and each receiving the output signal of relay 57 of the position detecting device 52 relative to the enclosure 4 represented by the light-up element $L_1$–$L_n$ itself.

More specifically, when the output signal of relay 57 assumes a high value S1, the light-up element assumes a first state (e.g. on); and, when the output signal of relay 57 assumes a low value S2, the light-up element assumes a second state (e.g. off).

Purely by way of example, line 1 may be laid between the rails (not shown) of a railroad line (not shown), with enclosures 4 housed inside a parallelepiped seat (FIGS. 2–4) in the ballast (not shown). When so laid, plates 34 face upwards and are substantially coplanar with the rails (not shown). Power line 23 is conveniently connected to a ground potential, while power line 27 is connected to a positive supply potential.

Power line 1 is used in conjunction with an electric vehicle, for example, a railroad vehicle 80 (shown schematically in FIG. 1) traveling along the railroad line (not shown).

Electric vehicle 80 has a central portion defined by a floor 82 facing and parallel to plates 34, and comprises, internally, a pair of electromagnets (or permanent magnets) 84 for generating a magnetic field from floor 82 towards enclosures 4.

When an enclosure 4 is not engaged by electric vehicle 80, conducting element 60 is in a rest position (FIG. 2) in which it is substantially undeformed and parallel to bottom wall 20. More specifically, in the rest position, conducting strip 67 is substantially coplanar with plane C and rests, along the whole length of each enclosure 4, on portion 20a of power line 23 and on flat portions 45 of the various feeder devices 40, so that an electric connection is established between flat portions 45 and bottom wall 20, and therefore between all the feeder devices 40 (and plates 34) and power line 23.

In the rest position (FIGS. 2 and 10a), conducting strip 67 (substantially coplanar with plane C) is parallel and adjacent to rectangular support 53 along the whole length of each enclosure 4, with conducting elements 70 facing support 53. More specifically, each conducting element 70 is positioned with the curved end portions contacting two adjacent conducting pads 54, so that a bridge connection is formed between conducting pads 54, and an electric connection is formed between all the pads of support 53 to form a continuous electric connection between the end pads 54a and 54b. Relay 57 is therefore supplied with the direct voltage on line 58, and closes to supply a high output signal S1 to turn on respective light-up element $L_n$ and so indicate non-engagement of enclosure (module) 4.

When conducting strip element 60 is in the rest position, plates 34 are therefore all connected to ground potential. Line 1 is therefore intrinsically insulated, in that all the outer parts (plates 34) are at ground potential, and the live parts (lines 27) are housed inside insulating enclosures 4 (high degree of insulation of line 1) and inside metal enclosures 17 (high degree of shielding of line 1). In the rest position, (positive) electric power line 27 is in fact insulated from all the other metal parts of line 1 and housed inside metal enclosure 17. In particular, line 27 is insulated and separated physically from portion 51 (first collector). When power line 1 is engaged by electric vehicle 80 and electromagnets 84 are active, a magnetic force of attraction is generated by the interaction between the field of electromagnets 84 and ferromagnetic conducting portion 65, so that conducting element 60 is drawn and flexed upwards towards electromagnets 84. As shown clearly in FIGS. 1, 3, 4, 10b, the portion 60a of conducting strip element 60 affected by the force of attraction is drawn upwards into the shape of an arc towards wall 25. More specifically, portion 60a of conducting element 60 beneath electromagnets 84 (and therefore subjected to a strong force of attraction) moves into an activated position parallel and adjacent to insulating wall 30 (FIGS. 1 and 4) and with strip 65 contacting portion 27a of first power line 27 and at least one first collector 51. An electric connection is thus established, via strip 65, between first power line 27 and first collector 51, and therefore between line 27 and a plate 34. In the FIG. 1 embodiment, the shape and arrangement of electromagnets 84 are such that strip 65 contacts first collectors 51 of two adjacent feeder devices 40, so that two adjacent (live) plates 34 are disconnected from the negative power line and connected to positive power line 27. Electric vehicle 80 comprises at least a first pickup device 87 (FIG. 1) located beneath floor 82, near electromagnets 84, to mate with live plates 34 and supply positive electric power to run electric vehicle 80.

The portions of conducting strip element 60 adjacent to portion 60a are inclined with respect to portion 60a and slant downwards by force of gravity towards wall 10. The inclined portions 601 are spaced and physically separated from first collector 51 and second collector 45 (FIG. 3), and are also spaced and separated from first power line 27 and second power line 23 (FIG. 3).

Inclined portions 601 end when conducting strip element 60 comes to rest on bottom wall 20 of second conducting line 23 and on second collectors 45 of feeder devices 40, so that all the plates 34 of line 1 which are not live are connected to conducting line 23.

In the activated position (FIG. 10b), conducting strip 67 of portion 60a, together with the relative conducting elements 70 carried by it, is detached from rectangular support 53. More specifically, at least one conducting element 70 is positioned with the curved end portions detached from two adjacent conducting pads 54, thus cutting off the electric connection established between pads 54a, 54b in the rest position described previously. Relay 57 is therefore de-energized, and opens to supply a low output signal S2 to turn off the respective light-up element and so indicate engagement of the module.

Electric vehicle 80 also comprises at least a second pickup device 88 (FIG. 1) located beneath floor 82, behind/in front of electromagnets 84 in the traveling direction of the electric vehicle. Pickup device 88 mates with a plate 34 connected to line 23, and supplies negative electric power by which to run electric vehicle 80.

As electric vehicle 80 travels along, successive portions of strip element 60 are deformed, and portion 60a, following the motion of the electric vehicle, moves along the various enclosures 4 forming part of line 1, so that the arced portion 60a of conducting strip element 60 travels wavelike along line 1, from one end to the other of each enclosure 4, and, on reaching the end portion of one enclosure 4, moves to the end portion of the adjacent enclosure 4.

Bridging device 110 provides for rigidly connecting the opposite end portions 60e of conducting strip elements 60 in adjacent enclosures 4 of modular line 1, so that, as the arced portion 60a of strip element 60 reaches the end portion of one enclosure 4, the end portion of the strip element of the next enclosure 4 is automatically flexed upwards, and the arced portion travels wavelike along the adjacent enclosures 4.

The movement of end portion 60e is made possible by the particular design of supporting and connecting device 62. More specifically, when the end portion is in the rest position (FIG. 7), the end portions 60e housed in adjacent enclosures 4 are horizontal, with metal strip 67 bridging flat portion 45 and bottom wall 20, so that undulated portions 100a, 100b are undeformed. The upward movement of end portion 60e, made possible by the deformation of wall 100 (FIG. 6), stretches undulated portions 100a and compresses undulated portions 100b; and undulated portions 100a (stretched) exert downward pull on end portion 60e to assist the return downward movement of portion 60e when the magnetic force of attraction is extinguished.

According to the present invention, there is provided a modular power line enabling the location of the electric vehicle along the line to be detected. Which location is detected in a straightforward, effective manner by determining the modules in which conducting element 60 is in the rest position, and the module in which the conducting element is in the raised attracted position described above.

Clearly, changes may be made to the power line as described and illustrated herein without, however, departing from the scope of the present invention.

Central control unit CNT may perform more complex control and monitoring functions. For example, by monitoring the signals from detecting devices 52 of different successive enclosures (modules), the central control unit may determine successive engagement of the modules indicating normal travel of the electric vehicle, and may emit a fault signal in the event an engagement signal relative to an n-th module is detected without a signal from an n−1-th module, adjacent to the n-th module and engaged first by the electric vehicle according to its traveling direction, first indicating engagement of the n−1-th module. In response to the fault signal, control unit CNT may also provide for immediately cutting off power to line 1.

Control unit CNT may also acquire and memorize the successive instants $T_n, T_{n+1}, \ldots T_N$ at which the engagement signals from detecting devices 52 of different successive enclosures (modules) are received, and, given the length of each module, may use the above time references to calculate the traveling speed of the electric vehicle, which, between two adjacent modules, is given by the equation: $V_{n,n+1}$= Module length/$(T_{n+1}-T_n)$.

Provision may also be made (FIG. 10b) for a resistance measuring device 200 (shown schematically) for measuring the resistance R between conducting pads 54 (or at least one conducting pad 54) and metal enclosure 17 (shown schematically) defining line 23, and for generating a fault signal in the event the measured resistance R falls below a threshold value. A low resistance R value, in fact, generally indicates the presence of external conducting agents (e.g. water, steam, etc.) inside enclosure 4.

The circuit arrangement in FIGS. 10a, 10b may also differ. A first end pad (e.g. pad 54a) may be connected directly to a positive terminal of a direct-voltage power source (not shown) with a grounded negative terminal; and a second end pad (e.g. pad 54b) may be connected directly to a first terminal of an electric line for supplying output signal S1, S2. In which case, when the strip element is in the rest position, a high output signal S1 equal to the voltage supplied by the direct voltage source is generated (nonengagement of modular enclosure 4); and, when a portion of the strip element is in the raised position, a low output signal S2 (of 0 volts) is generated to indicate engagement of modular enclosure 4. The above arrangement provides for eliminating relays 57.

What is claimed is:

1. A power line for an electric vehicle, comprising:
    a number of conducting elements (34) arranged in a traveling direction (8) of the electric vehicle (80) and separated electrically from one another;
    at least a first conducting line (27) supplied with a first polarity;
    a strip element (60) extending in said traveling direction (8) along substantially the whole length of the line;
    an enclosure (4) for housing said strip element (60);
    said strip element (60) being elastically deformable and comprising at least one portion made of ferromagnetic material (65);
    said strip element (60) being positionable in a rest position in which it extends substantially undeformed along said enclosure;
    said portion made of ferromagnetic material (65) interacting with a magnetic field generated by excitation means (84) carried by said electric vehicle (80) engaging said line, to attract at least one portion (60a) of said strip element (60) into a contact position in which an electric connection (51, 65, 27) is established between said first conducting line (27) and at least one of said conducting elements (34);
    characterized by comprising position detecting means (52) for detecting a first arrangement in which said strip element (60) is in said rest position, and a second arrangement in which at least a portion of said strip element (60) is in said contact position.

2. A power line as claimed in claim 1, characterized in that said position detecting means (52) comprise switching means (54, 70) activated by the movement of said strip element (60).

3. A power line as claimed in claim 2, characterized in that said switching means (54, 70) are closed for said first arrangement, and are opened when at least a portion of said strip element (60) is in said contact position.

4. A power line as claimed in claim 3, characterized in that said switching means comprise at least a first and a second contact element (54) electrically separated from each other and carried by said enclosure (4), and interconnecting means (70) carried by said strip element (60); said interconnecting means (70) establishing an electric bridge connection between said first and second contact element (54) at least as regards the portions of said strip element in said rest position.

5. A power line as claimed in claim 3, characterized in that said switching means comprise a number of contact elements (54) electrically separated from one another and arranged along said enclosure (4), and a number of interconnecting devices (70) electrically separated from one another and arranged (72) along said strip element (60); each said interconnecting device (70) establishing an electric bridge connection between two adjacent ones of said contact elements (54) as regards the portions of said strip element (60) in said rest position;

said interconnecting devices (70) establishing, together with said contact elements (54), a continuous electric connection between end ones of said contact elements (54a, 54b), as regards said strip element (60) in said rest position.

6. A power line as claimed in claim 2, characterized in that each said conducting element (34) communicates electrically with first collector means (51) and second collector means (45) housed in a cavity (6, 18) of said enclosure (4);

said cavity (6, 18) also. housing said first conducting line (27) and a second conducting line (23) separated from the first conducting line (27);

said strip element (60) establishing an electric contact between said second conducting line (23) and said second collector means (45) as regards the portions of said strip element (60) in a rest position in which the strip element (60) is elastically undeformed and rests on said second collector means (45) and on said second conducting line (23); and said strip element (60) establishing an electric contact between said first conducting line (27) and said first collector means (51) as regards the portions of said strip element (60) in said contact position.

7. A power line as claimed in claim 6, characterized in that said first collector means (51) and said second collector means (45) comprise flat conducting portions housed in said cavity (6, 18) and facing each other on opposite sides of the cavity (6, 18);

said first conducting line (27) and said second conducting line (23) comprising respective flat elongated conducting portions (27a, 20a) housed facing each other inside said cavity (6, 18) and extending substantially the whole length of said enclosure (4);

said strip element (60) comprising:

striplike insulating means (63) extending substantially the whole length of said enclosure (4);

ferromagnetic first conducting elements (65) carried on a first side of said striplike insulating means (63) and facing said first collector means (51) and said first conducting line (27);

second conducting elements (67) carried on a second side of said striplike insulating means (63) and facing said second collector means (45) and said second conducting line (23);

said second conducting elements (67) establishing an electric bridge connection between said second conducting line (23) and said second collector means (45) as regards the portions of said strip element (60) in said rest position; and said first conducting elements (65) establishing an electric bridge connection between said first conducting line (27) and said first collector means (51) as regards the portions of said strip element (60) in said contact position.

8. A power line as claimed in claim 7, characterized in that said first conducting line (27) comprises a contact portion (27a) substantially coplanar with a contact portion (51) of said first collector means (51);

said first conducting elements (65) being of a width (L) greater than the distance (d) between adjacent edges (51b, 27b) of said contact portions of said first collector means (51) and said first conducting line (27);

said first conducting elements (65) being interposed, as regards the portion of said strip element in said contact position, between said contact portion of the first collector means (51) and the contact portion of the first conducting line (27).

9. A power line as claimed in claim 7, characterized in that said second conducting line (23) comprises a contact portion (20a) substantially coplanar with a contact portion (45) of said second collector means;

said second conducting elements (67) being of a width (L) greater than the distance (h) between adjacent edges (45b, 20b) of said contact portions of said second collector means (45) and said second conducting line (23);

said second conducting elements (67) being interposed, as regards the portion of said strip element in said rest position, between said contact portion of the second collector means (45) and said contact portion (20a) of the second conducting line (23).

10. A power line as claimed in claim 4, characterized by comprising resistance measuring means (200) for measuring the resistance (R) between at least one said contact element (54) and a metal portion (17) inside said enclosure and electrically separated from said contact element (54); said resistance measuring means (200) generating a fault signal indicating the presence of external conducting agents inside the enclosure (4), in the event the measured said resistance falls below a threshold value.

11. A power line as claimed in any claim 10, comprising a number of said enclosures (4) aligned with one another; each said enclosure housing a respective strip element (60) connected to the strip elements of adjacent, enclosures, and having said position detecting means (52) for detecting said first or said second arrangement, and for generating in response (57) an output signal (S1, S2) assuming a first or a second state (S1,S2) respectively;

said line also comprising a central control unit (CNT) for receiving the output signals from different successive enclosures;

said central control unit (CNT) determining sequential engagement of the enclosures (4) by said electric vehicle (80), which sequential engagement indicates normal travel of the electric vehicle; and the central control unit emitting a fault signal in the event an engagement signal relative to an n-th enclosure (4) is detected without a signal from an n−1-th enclosure (4), adjacent to said n-th enclosure and engaged first by the electric vehicle according to its traveling direction, first indicating engagement of said n−1-th enclosure (4).

* * * * *

UNITED STATES PATENT AND TRADEMARK OFFICE
CERTIFICATE OF CORRECTION

PATENT NO. : 6,189,664 B1　　　　　　　　　　　　　　　　　　　　　Page 1 of 1
DATED : February 20, 2001
INVENTOR(S) : Siciliano It is certified that error appears in the above-identified patent and that said Letters Patent is hereby corrected as shown below:

<u>Title page,</u>
Item [73] Assignee: Ansaldo Transporti S.p.A., Naples (IT)," should be -- [73] Assignee: Ansaldo Trasporti, S.p.A., Naples (IT) --.

<u>Column 6,</u>
Line 45, "601" should be -- 601 --.
Line 48, "601" should be -- 601 --.

Signed and Sealed this

Twelfth Day of March, 2002

Attest:

JAMES E. ROGAN
*Attesting Officer*　　　*Director of the United States Patent and Trademark Office*